Figure 1:
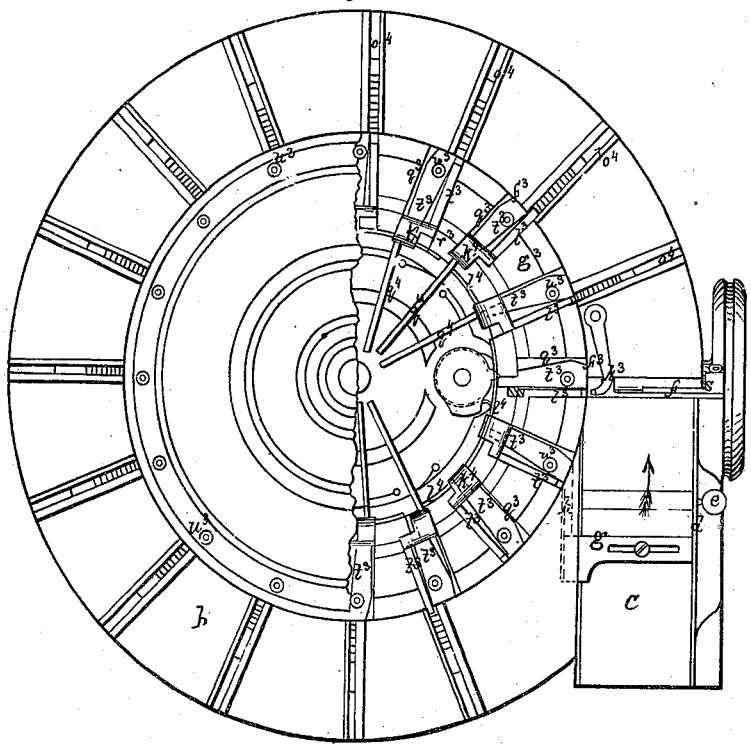

O. L. Brown.
Type Distributing Mach.e
N°. 100,366. Patented Mar. 1. 1870.

Rear Elevation.

Witnesses:
S. B. Kidder
M. W. Frothingham

Inventor:
O. L. Brown
Per Crosby Halstead & Gould
Att'ys

O. L. Brown.
Type Distributing Mach.
N° 100366. Patented Mar. 1. 1870.
Sheet 2. 4 Sheets.
Fig. 3.
Front Elevation
(of part)
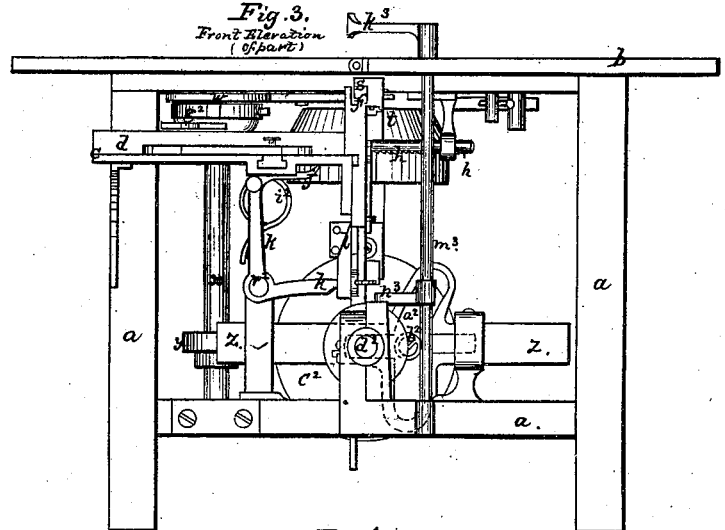
Fig. 4.
Side Elevation of above
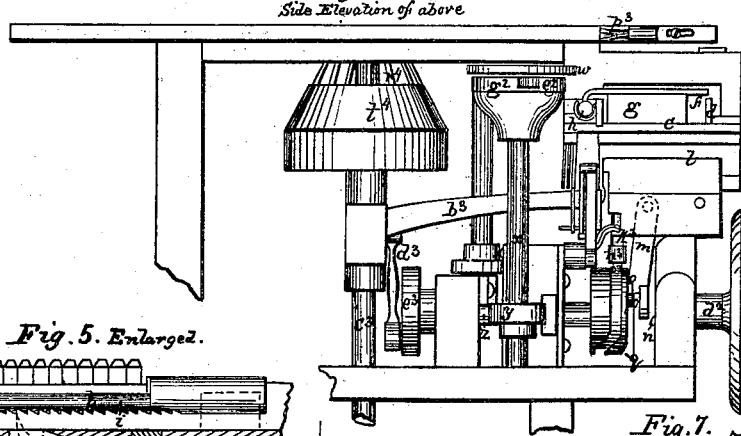
Fig. 5. Enlarged.
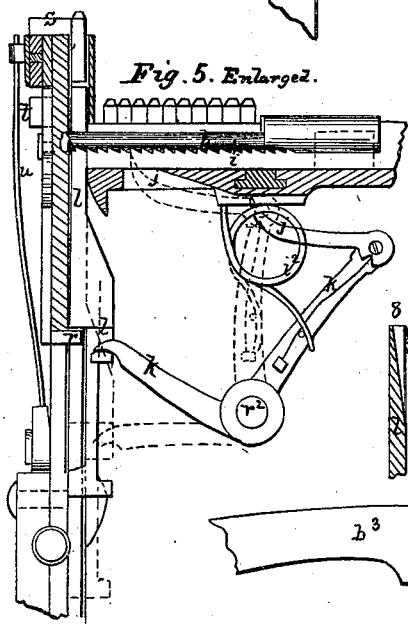
Fig. 6.
Enlarged
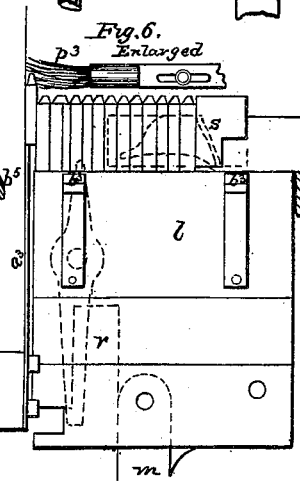
Fig. 7.
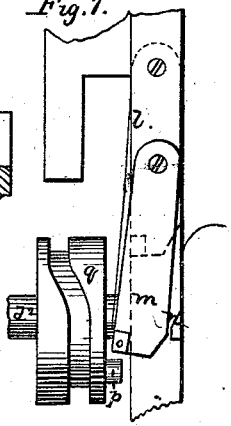
Witnesses:
J. B. Kidder
M. W. Frothingham
Inventor:
O. L. Brown
Crosby Halstead & Gould Attys O. L. Brown. Sheet 3. 4 Sheets.
Type Distributing Mach.
Nº 100366. Patented Mar. 1. 1870.
Fig. 9.
Side Elevation
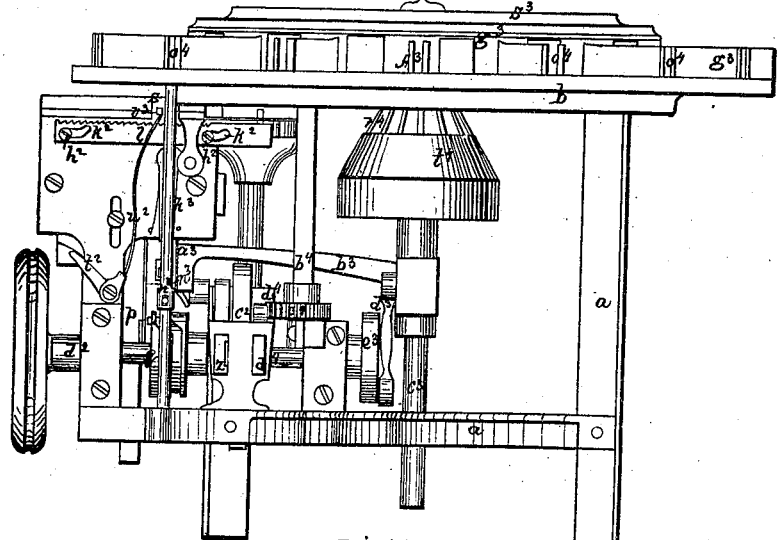
Fig. 10.
Same as above.
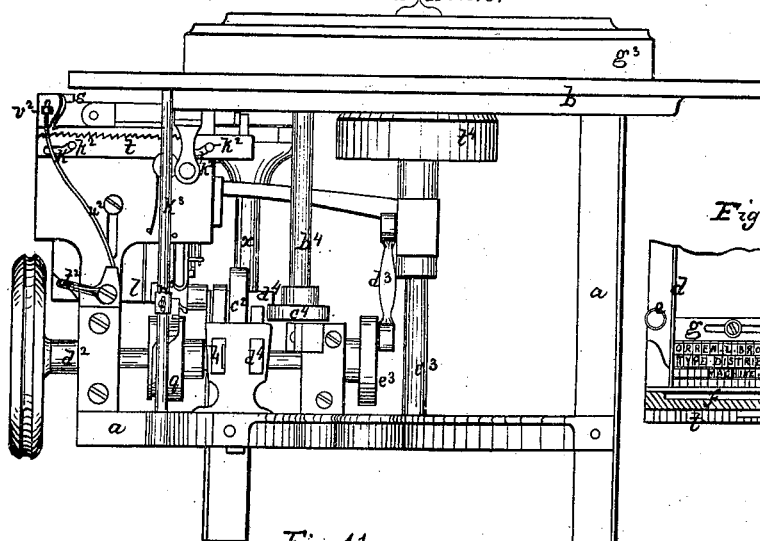
Fig. 12.
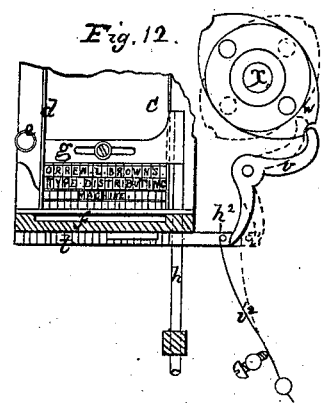
Fig. 11.
Enlarged.
Witnesses:
J. B. Kidder.
M. W. Frothingham.
Inventor:
O. L. Brown
Per Crosby, Halstead & Gould Att'ys

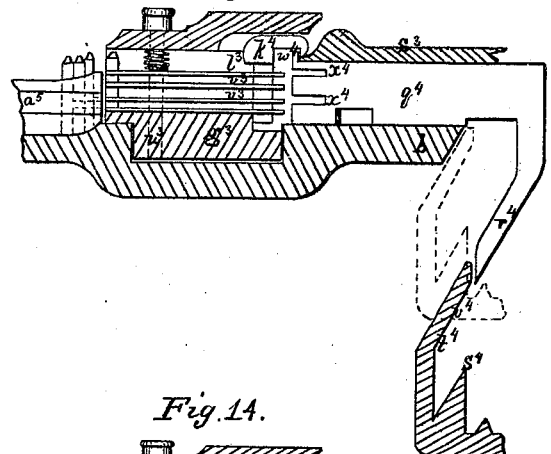
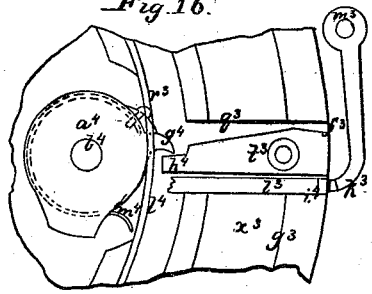
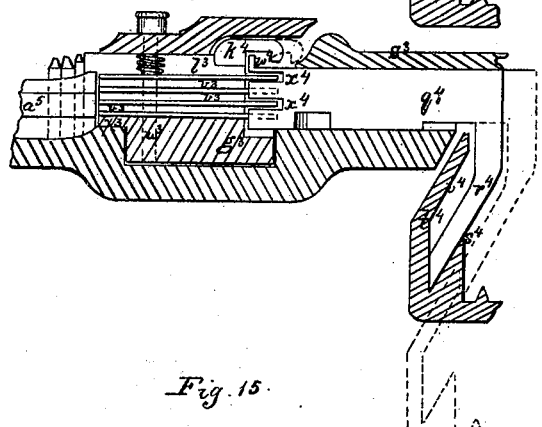
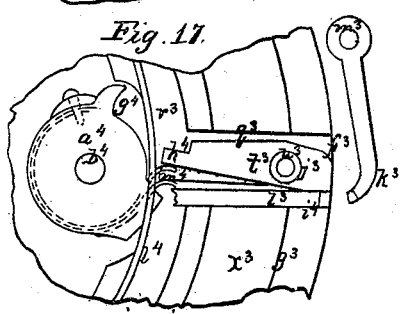
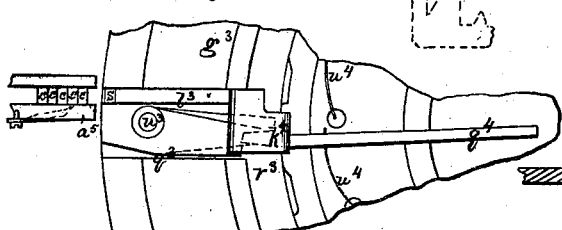
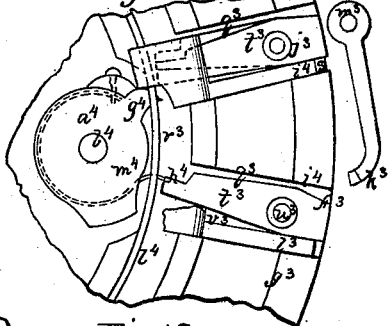
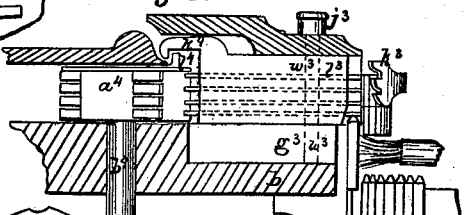
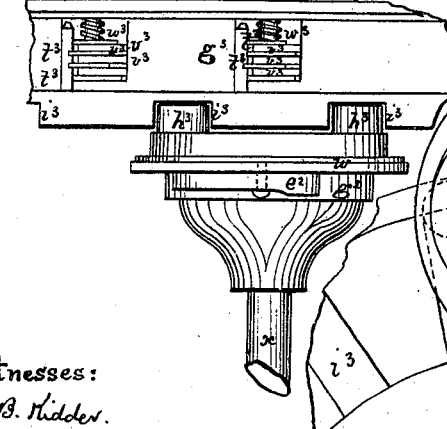
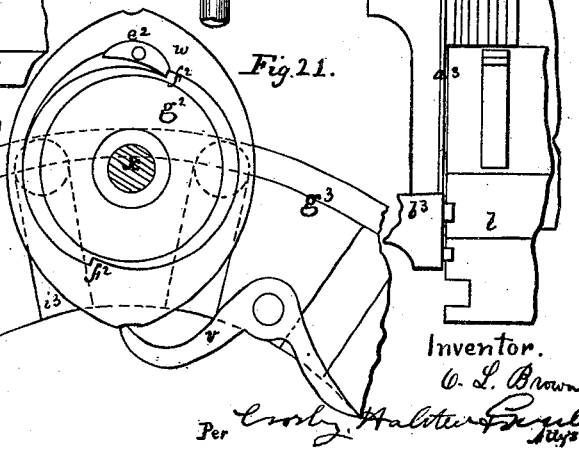

UNITED STATES PATENT OFFICE.

ORREN LEE BROWN, OF BOSTON, MASSACHUSETTS.

IMPROVEMENT IN TYPE-DISTRIBUTING MACHINES.

Specification forming part of Letters Patent No. 100,366, dated March 1, 1870.

*To all whom it may concern:*

Be it known that I, O. L. BROWN, of Boston, in the county of Suffolk and State of Massachusetts, have invented an Improved Automatic Type-Distributer; and I do hereby declare that the following, taken in connection with the drawings which accompany and form part of this specification, is a description of my invention sufficient to enable those skilled in the art to practice it.

As indicated by the title of this specification, the invention relates to an organization of mechanism for taking types as they come from a press, picking out the several letters and characters, and so distributing them that all the types of every kind are respectively located in their separate and proper places.

The object of the invention is to obtain a simple machine (for automatically distributing types) that is positive in its operation, easy to understand, not liable to get out of order, and requires no skill to operate it.

The types are distributed by means of a series of tumblers and keys, actuated and operating in accordance with the number or position of nicks in the separate types or characters to be distributed.

Machines have been heretofore made to distribute types by means of such nicks; but such machines have been complicated in their construction and operation, and have not done their work with certainty.

My machine not only does its work with certainty, but handles the types in such a manner that no damage can be done them while in the machine.

With my invention the types are taken one line at a time from the page of types, which is placed in the galley, and from this line the types are taken letter by letter, and fed to an intermittently-rotating ring, where they are held respectively by sets of levers or tumblers, which sets are placed at regular intervals, four or more in a set, in slots in the upper side of the distributing-ring, each set of levers or tumblers being precisely like every other set, and each tumbler in the set being free to move independently or relatively to the others in the set, so that it makes no difference which set of tumblers receives the type.

These tumblers are so placed that one edge of the short arm of any one of them may be pressed into any nick that may have been made (in line with it) in the particular type received by it, so that if a type with one nick in its edge is fed to the ring when the tumblers are pressed against its side, the tumbler that is opposite the nick will assume a different position from the others, and the position of this tumbler will decide where the letter shall be left.

In connection with each set of tumblers there is a follower or ejector, which forces out the type when it reaches its proper place. These ejectors are operated by slides or keys placed in slots in the bed of the machine inside the ring, and radiating from the center, these keys being placed at regular intervals, corresponding with the positions of the several ejectors and sets of tumblers when the ring is at rest, there being the same number of keys as there are ejectors.

The number of tumblers in each set is governed by the number of different letters the machine is intended to distribute—for instance, four tumblers will allow of fifteen combinations, five tumblers will allow of thirty combinations, six will give sixty, and so on.

It will be obvious, therefore, that with a sufficient number of receiving-tumblers, keys, and channels, the machines will distribute all the different characters which are commonly used in printing.

As each letter is forced out by its follower it is received in one of a series of channels which radiate from the ring, the letter next the ring being held in an upright position by a spring, which presses against its side, and prevents its falling into the ring.

It is in a machine having this general organization that my invention primarily consists.

The drawings represent a machine and the details of a machine embodying my improvements.

Figure 2:
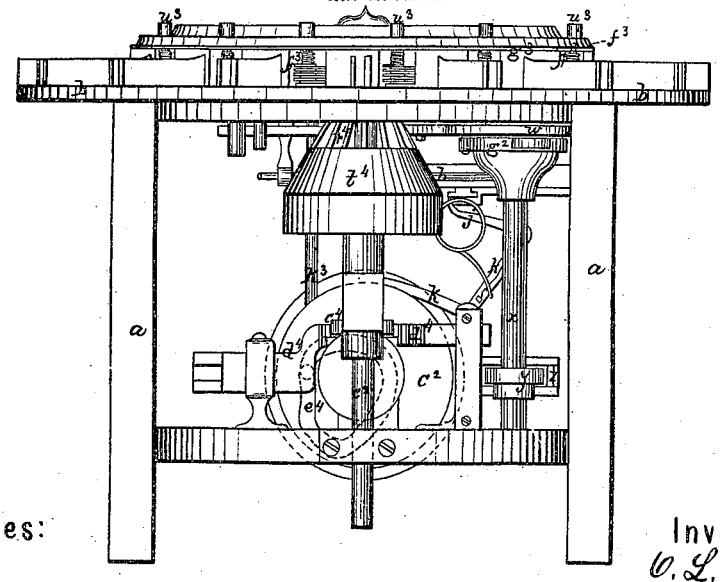

Figure 1 shows the top of the machine with part of the cap-plate removed. Fig. 2 is a rear elevation. Fig. 3 is a front elevation with driving-wheel and distributing-ring removed. Fig. 4 is a side elevation with distributing-ring and part of frame-work removed. Fig. 5 shows (enlarged) the lifter-plate and mechanism adjacent thereto. Fig. 6 shows (enlarged) the lifter-plate, line-follower, brush, and springs for removing the leads. Fig. 7 illustrates the operation of the pawl for raising the lifter-plate. Fig. 8 is a sectional view of the lifter-plate and spring for removing the leads. Fig. 9 is a side elevation, showing the key-actuator at its lowest position and the lifter-plate at its highest position, the distributing-ring being in motion. Fig. 10 is a side elevation, showing the key-actuator at its highest position, the lifter-plate at its lowest position, and the line-follower thrown back to allow another line of types to be forced up by the lifter-plate. Figs. 11 and 12 illustrate the action of the line-follower, &c. Figs. 13, 14, and 15 are sectional views, illustrating the action of the key-actuator, keys, &c. Figs. 16, 17, 18, and 19 are detail views, illustrating the action of the tumblers $t^3$, springs $w^3$, &c. Figs. 20 and 21 show the clutch for actuating the distributing-ring, &c.

$a$ denotes a frame, supporting upon its top a table or plate, $b$, this table and frame supporting the operative mechanism.

On one side of the frame, below the level of the table, is a "galley," $c$, upon which the types are placed, one page or more at a time, one side wall, $d$, of the galley being movable for reception of the different-sized pages, the piece $d$ being held in place by means of a set-screw, $e$.

The types are forced in the direction of the arrow, Fig. 1, until the front line rests against an end wall, $f$, and the other end of the types is supported by a slide or page-follower, $g$, connected to and moved by a rod, $h$, which has a rack, $i$, Fig. 5, cut on its under side, the rod being intermittently fed by a pawl, $j$, (hung to the upper end of a right-angle lever, $k$,) engaging with this rack, and thus operating the slide or follower, the other end of the lever being sppported by a lifter-plate, $l$. When the types are thus pressed forward, the front line stands directly over the edge of this lifter-plate $l$, which is just the thickness of the line of types, the top of the plate being slightly below the surface of the galley $c$, and the plate sliding vertically against the end wall $f$. Attached to the lifter-plate is a swing-bar, $m$, which is forced out (at proper times) by a stationary incline, $n$, Fig. 7, so as to bring a stud, $o$, (projecting from the swing-piece) into the path of rotative movement of a pin, $p$, on the side of a cam-wheel, $q$, on the main driving-shaft, the cam-pin raising the swing-bar, and with it the lifter-plate $l$, to which the swing-bar is jointed, as seen in Fig. 7.

The swing-bar is held normally in the position shown by dotted lines in Fig. 7 by a suitable spring, so that it will not come in contact with the pin unless it is forced out by the incline $n$, so that if, from any cause, the lifter-plate is prevented from falling low enough to allow the next line of types to advance to its position over the edge of the lifter-plate, the swing-bar will not strike the incline, the lifter-plate will not be forced up, and no damage will be done.

When the lifter-plate reaches its highest point it is held by a latch, $r$, Figs. 5 and 11. As the lifter-plate is moved up, the line of types that rests on its top edge is forced into a groove or channel just wide enough to receive a single line, the outer end of the line being supported by a line-follower, $s$, Fig. 6, which feeds the line along as it is intermittently reduced in length by removal of the types, type by type, from the inner end, as will be hereinafter explained.

The line-follower $s$ is operated by a sliding rack, $t$, spring $i^2$, lever $v$, and cam $w$, Fig. 12, the follower being so actuated that there is no pressure on the line of type at the time each end one is being removed from the inner end of the line, thus allowing the types to be separated much more easily than they could be if the pressure existed during the process of removal of any type.

The operations of the follower and its actuating mechanism are as follows: The cam $w$ is located directly under the table $b$, and turns loosely on a vertical rocker-shaft, $x$. Near the foot of this shaft is a segmental pinion, $y$, the teeth of which engage with a sliding rack, $z$, having a cam-slot, $a^2$, into which enters a crank-pin, $b^2$, on one side of a cam-wheel, $c^2$, on the driving-shaft $d^2$. At each complete rotation of the shaft the pin on the cam-wheel $c^2$ effects a complete reciprocation of the rack. Under the cam $w$ is a spring-clutch or pawl, $e^2$, pivoted to the cam, and the point of this cam-pawl engages, at proper times, with two teeth, $f^2$, on a clutch or pawl-wheel, $g^2$, fixed on the rocker-shaft $x$. As the rack $z$ moves inwardly, and turns the segment-pinion $y$ in one direction, the pawl-wheel, in turning, slides under the pawl, and imparts no motion to the cam $w$; but as the rack is slid outwardly, and thereby turns the pawl-wheel in the opposite direction, one of the teeth of the pawl-wheel engages with the pawl or clutch $e^2$, and carries the cam with it.

There are two cam-projections on the cam-wheel, diametrically opposite, and two diametrically-opposite teeth on the pawl or clutch wheel, so that at each intermittent rotative and forward movement of the pawl-wheel the cam $w$ is moved a half rotation. When the cam $w$ is at rest—namely, during the inward movement of the rack $z$—one arm of the lever $v$ rests against, or is opposite to, one of the cam-projections, as seen in Fig. 12, the other arm of the lever resting against a pin, $h^2$, projecting from the follower-rack $t^2$, this rack-pin being held up to the lever by a suitable spring, $i^2$, Fig. 12. As the cam $w$ moves from this position the adjacent arm of the lever $v$ can move toward the center of the cam, thereby permitting the other arm of the lever to move when the spring $i^2$, acting on the pin $h^2$, presses forward the follower-rack $t$, and with it the line-follower $s$, the follower being provided with a pawl, $j^2$, jointed to the follower, the tooth of which pawl engages with the teeth of the follower-rack $t$, so that the forward movement of the rack carries with it the follower. The object of the spring $i^2$, instead of employing a positive connection of the rack with the lever $v$, is to permit the extent of the forward motion of the rack to be governed by the thickness of the type.

The rack rests and reciprocates on pins $k^2$ projecting through slots $k^3$ in the rack. At the inner end of each slot is an incline, $l^2$, and when the rack is moved outward these inclines enable the rack to drop out of connection with the follower-pawl $j^2$ to allow the follower to be moved back for another line, and then the lifter-plate $l$ is forced up, carrying with it the front line of types (which has been brought up to the wall $f$ by the page-follower $g$) and reaches a position which brings the line of types into the channel from whence they are to be removed type by type, the latch $r$ being forced under the lifter by a suitable spring, $r^x$, and locking the lifter in its raised position. This latch is hung on a pin, $n^2$, as seen in Fig. 11, and over the pin an arm, $o^2$, projects up from the latch-bar, the top of this arm being in the path of forward movement of a stud, $p^2$, projecting down from the line-follower $s$.

As the last type in the line occupying the channel is forced up into position for removal the position of the line-follower causes the finger to strike the arm $o^2$, thereby swinging the latch free from the lifter $l$, which is then free to fall, its descent being effected by the bent lever $k$, Figs. 3 and 5, pivoted at $r^2$. One arm of this lever extends into a notch in the lifter, as seen in Fig. 5, and against its other arm a spring, $i^2$, acts, the stress of this spring carrying the lifter down, (when released from its latch,) bringing it into position for the next front line of types to be fed over it preparatory to being raised by it into the channel or groove leading to the distributer.

The descent of the lifter effects the back or outward movement of the line-follower, that presses the types toward the distributer, as follows: A lever, $t^2$, pivoted as seen in Figs. 9 and 10, carries at the end of one arm a rod or spring-wire, $u^2$, the upper end of which is slipped through a projection, $v^2$, on the follower. The other arm of the lever has at its end a finger, which projects under the lifter, or a shoulder upon the lifter. When the line of types has been fed or nearly fed out to the distributer, the lever $t^2$, follower $s$, &c., are in the position shown in Fig. 9, and when the lifter descends it actuates the lever $t^2$, and causes it to slide back the follower, as seen in Fig. 10.

The upper arm of the lever $k$ has jointed to it the spring-pawl $j$, as seen in Fig. 5, this pawl engaging with the rack $i$ on the under side of the rod $h$ that moves the page-follower $g$, to which it is attached. Normally, or while the types are being fed to the distributer, this pawl is not in engagement with the rack, but is held back, as seen by the full lines in Fig. 5, the lever $k$, when the lifter is upheld by its latch, retaining the pawl in this position. But when the lifter descends to receive a new line of types the movement of the lever throws forward the pawl, and as the pawl-point reaches the rack it is pressed up against the same by its spring, and, engaging with same tooth of the rack, it feeds forward the rod $h$ and page-follower $g$ attached thereto, and this follower feeds the page of types forward, bringing the front line of types over the lifter, in position to be raised into the channel, as before described.

Upon the descent of the lifter $l$ the incline on the galley prevents the pawl $j$, as it advances, from coming in contact with the teeth of rack $i$ until the proper period, in order that the follower $g$ shall not advance the page until the top edge of the lifter-plate is below the surface of the galley.

As the pawl is jointed to the lever, and the upper arm of the lever rests against the spring, it will readily be seen that in feeding the page of types forward the pawl can yield in accordance with the thickness of the types. When the front line of types is thus brought over the lifter, and the instant the pin $p$ on the cam-wheel $q$ begins to raise the lifter the action of the lifter on the lever $k$ draws back the pawl, and thereby relieves the types from the pressure of the follower $g$, so that the lifter has no friction to overcome of the other lines of types against the front line.

The lifter is arranged to sink slightly below the surface of the galley, and this pressure upon the types is, therefore, taken away before the lifter reaches the bottom of the line of types to be raised.

It will be observed that the spring $i^2$ is so arranged that its greatest stress is exerted when the pawl $j$ is engaged with the teeth of the rod $h$ to move forward the types upon the galley. It will also be observed that the outward movement of the line-follower and the downward movement of the lifter are effected together, and the former by the latter, so that if by any accident the line-follower cannot run back to the end of the channel, then the lifter cannot descend far enough for its swing-bar $m$ to be thrown by the incline $n$ into position to be raised by the pin of the cam-wheel $q$.

Having thus described the mechanism for feeding forward intermittently and successively the page of types in the galley, so as to bring each line of type in succession over the lifter, the mechanism for lifting each line in succession into the channel for the action of the channel or line-follower, by which the line is pressed toward the type-distributing mechanism, and the devices operating as adjuncts to these operations, it remains to describe the mechanism by which each type is taken singly and conveyed to its proper destination.

At the inner end of the channel a shallow groove is made in the adjacent edge of the table, and the face of a plate below and flush with the back of this groove furnishes a wall against which the inner type of the line is pressed by the line-follower. In vertical line with the end of the channel, and sliding against this wall, is a thin narrow tongue or slide, $a^3$, Figs. 6 and 19, which is as small or smaller in cross-section than is any one of the types to be distributed, (in cross-section.) This tongue is shown in Figs. 6 and 19. It is fastened at its lower end to the outer end of a long arm, $b^3$, fixed to and extending from a central and vertical shaft, $c^3$. When this tongue is at its lowest position its tip or point is below the channel, and the end type is carried and stops directly over it. At each rotation of the main shaft the tongue is raised, and pushes up the single type resting upon it, carrying such type into position to be removed by the distributer-ring. The vertical shaft $c^3$ is supported in suitable bearings, and is connected by a link, $d^3$, to a wrist-pin on a crank-wheel, $e^3$, at the inner end of the driving-shaft, and as the driving-shaft rotates, the vertical shaft is reciprocated vertically, carrying with it the arms $b^3$ and tongue $a^3$. The single type raised by the tongue is carried above and out of the type-channel and into some one of a series of mouths or openings, $f^3$, made in the periphery of distributer-ring $g^3$, the bottom of the type being carried slightly above the bottom of the ring $g^3$, where it is held by a finger, $k^3$, (between the inner end of such finger and the outer end of a slide or type-ejector, $l^3$,) for the action of the selecting-levers or tumblers of the distributing-ring.

This ring sets into a wide circular groove made in the top of the table $b$, as seen in section in Fig. 14, and the ring is intermittently and rotatively moved as follows: At the top of the rocker-shaft $x$ is a cam-wheel, $w$, (as before described,) from the top of which wheel extend two pins, $h^3$, which work in slots $i^3$ on the under side of the ring $g^3$. At each rotation of the driving shaft one of these pins, engaging with some one of the slots $i^3$, imparts a rotative movement to the ring one space, or a distance equal to the distance between two adjacent type-followers, $l^3$, the cam-wheel being then held stationary by the lever $v$, while the clutch-wheel rotates back with the rocker-shaft $x$, bringing the clutch-pawl $e^2$ into engagement with the opposite tooth or notch, when the next forward movement of the rocker-shaft and clutch-wheel (produced by the next rotation of the driving-shaft) will again move forward the distributing-wheel or ring $g^3$.

As before observed, the type raised by the tongue is held by a finger, $k^3$, and type-ejector $l^3$, the tongue descending as soon as the type is brought into position between the finger and ejector. This finger is fixed to the top of a vertical rocker-shaft, $m^3$, Fig. 3, having fixed to it an arm, $n^3$, from which a pin, $o^3$, projects into a cam-groove in the periphery of the cam-wheel $q$ on the driving-shaft, and at each rotation of the driving-shaft this finger first takes the type, and, when the type is grasped by the distributing-tumblers, then moves outwardly from the ring, leaving the ring free to rotate. Above the channel is a brush, $p^3$, the bristles of which project into the groove into which the type is pushed, the bristles yielding to let any single type of any thickness pass, but preventing more than one type passing, should more than one ever be started up with the tongue. The ring $g^3$ has a series of radial slots, $q^3$, opening out to the periphery of the ring, and also opening, at its inner face, into a space, $r^3$, between the inner surface of the ring and the perimeter of a cap, $s^3$. In these slots are located the several sets of selecting or indicating levers or tumblers, (by which the types are selected in accordance with the character of each,) and the type-ejectors $l^3$, between the ends of which and the finger $k^3$ the types are held for the action of the selecting levers or tumblers, and by each of which (when the selected type is brought opposite to its appropriate channel by rotation of the ring $g^3$) the type is ejected from the ring. Each space in the ring is devoted to one of these sliding type-ejectors $l^3$ and one set of selecting levers or tumblers, $t^3$.

The levers of each set are fulcrumed on a vertical pin, $u^3$, and between each two adjacent levers is a stationary washer-plate, $v^3$, which, though free to move vertically, is confined from lateral movement within its slot by the wall of the slot. The levers and washer-plates in each slot are held together by a spring $w^3$, (held by a nut, $j^3$,) the bottom lever resting upon the part of the distributing-ring at the bottom of the slot, and, as the levers are moved upon their fulcrums, they are held in position by friction between the levers and washers. In normal position, or as each set of tumblers approach the finger $k$, their edges adjacent to their slide or type-ejector $l^3$ (near their outer end) are against the slide, or enter corresponding grooves in the adjacent face of the slide, and, as each set of levers comes into line with the end of the finger $k^3$, these lever edges are thrown back from the slide, and then again forward toward it, as follows: In radial line with the end of the finger is a cam or wheel, $a^4$, mounted on the top of a vertical rocker-shaft, $b^4$, to which is imparted an intermittent and reciprocating rotary motion, as follows: Near the foot of the shaft is a pinion, $c^4$, which engages with the teeth of a horizontal rack, $d^4$, from the opposite side of which a pin projects into a cam-slot, $e^4$, in the face of the cam $c^2$ on the driving-shaft. On the edge of the cam-wheel $a^4$ is a cam or wiper, $g^4$, and just as the ring stops this is brought, by movement of the rack $d^4$, against the tail-ends $h^4$ of the tumblers $t^3$, as seen in Fig. 16, forcing them all back, and thereby carrying the edges adjacent to the slide $l^3$ away from the slide and into a vertical plane, forming a vertical space between the edges of the tumblers and the wall $i^4$ of the slot $q^3$, and in front of the end of the ejector $l^3$, the ejector being held back by a hook, $k^4$, on its inner end, hooking over a flange, $l^4$, on the cap $s^3$. The type having then been fed up into the ring $g^3$, (one for each tumbler,) projecting from the cam-wheel, as seen in Fig. 17. These springs, moving the tumblers, carry their front ends toward the ejector $l^3$, and against the edge of the type, the edges of such tumblers as are opposite to nicks in the edge of the type being forced into such nicks by the action of the springs, as will be readily understood.

The inner arms of the tumblers are much longer than the outer arms, and as the tumbler-edges thus enter the type-nicks their inner arms will, of course, be thrown much farther out of line, as seen in Fig. 17. Having thus moved the tumblers, (in accordance with the number and position of the type-nicks,) the rack $d^4$ again starts forward and moves the springs away from the tumblers, leaving them in their new position, (in which they are held by friction,) the springs retreating into, or nearly into, the edge of the cap, as seen in Fig. 18, so that both the cam $g^4$ and springs $m^4$ are out of the path of movement of the tail ends of the tumblers. The ring then moves on, carrying with it the type held between the tumblers, the face of the ring-slot and the end of the ejector $l^3$ bringing the next set of tumblers opposite to the finger $k^3$, and bringing the type-holding tumblers opposite the first of a series of radial channels, $o^4$, leading from the ring out over the table $b$, as seen in Fig. 1, the outer end of the ejector $l^3$ being exactly in line with the channel, which is of the width of the type, and has a depth sufficient to hold the type in upright position against any suitable guide. In this position of the ring the hook $k^4$ at the end of the slide is in line with an opening in the flange of the cap, which opening permits the hook to move out through the flange, so as to bring the end of the slide flush with the periphery of the ring. Under the central cap $s^3$ is a series of radial slide-plates or keys, $q^4$, (one for each operative set of tumblers,) sliding radially through a vertical slot cut in a peripheral ring of the cap. Each key is formed as seen in Figs. 13 and 14, having at its inner end a bent arm, $r^4$, depending from it, the arm being bent outwardly, as seen in said figures, and the lower end or point of the arm standing normally just within a vertical line drawn from the circular edge of a sharp-edged flange or incline, $s^4$, projecting up from the base of a hollow cone or key-actuator, $t^4$, fixed on the top of the vertical sliding shaft $c^3$. The inner surface of the flange is vertical and the outer surface inclined, as seen in Fig. 14. At the upper end of the cone its inner surface inclines inwardly, as seen in Figs. 13 and 14. When the cone is rising each key is pressed outward by a spring, $u^4$; but if the outer end of the key strikes any obstruction at the periphery of the cap the foot of the arm $r^4$ is kept inside of the edge of the flange $s^4$, and the rise of the cone imparts no motion to the key, the arm passing inside of the flange; but if the end of the key meets no obstruction, the foot of the arm passes beyond the circle of the edge of the incline, and as the cone rises the incline strikes the arm $r^4$, and moves the end of the key far enough beyond the periphery of the cap to eject the type from the distributing-ring, the key being thus moved positively to eject the type, but only needing the pressure of a slight spring to indicate whether or not it is to be so moved. When the cone descends all the keys thus moved out are forced in again by the inner surface of the top of the cone.

As in each rotation of the driving-shaft the ring is completing its forward movement, the cone is moved up and the incline $s^4$ strikes all the arms $r^4$ that are beyond its edge, and carries them radially outward, as seen in Fig. 14, the incline not striking the arms until the movement of the ring ceases, and forcing out the keys, while the ring is stationary; and having thus forced out the keys the cone is drawn down by the descent of the slide-shaft, (as the driving-shaft continues to rotate,) the descent of the cone taking place while the ring is still at rest, and all the thrown-out keys being drawn inward (to their normal position) in such descent of the cone, their inward movement being effected by the inner surface $v^4$ of the cone coming in contact with the arms $r^4$, bringing them into the position shown in Fig. 13, as described. The outer end of each key has a lip, $w$, projecting up from it, and when the keys are drawn in, each lip $w^4$ is in concentric line with the flange of the peripheral ring of the cap $s^3$, and in the space in radial line with the ejector, and as the ring moves forward, the hook of each outer ejector $l^3$ hooks over the nearest lip, or the lip is brought into a slot of which the hook forms the inner side, as seen in Figs. 13 and 14.

Now, if, when the key is moved radially outward by the cone-ring $t^4$, the end of the key meets with no obstruction, the lip will strike the front surface of the slot, and will push out the ejector $l^3$, causing it to eject the type from its front end into the channel in line with the slide. If the type have no nicks it will be readily seen that the tumblers will stay in the positions into which they are removed by the cam $g^4$, and in this position their tail ends are all on one side of the end of the key which is opposite the first channel when the ring stops. Consequently, there being nothing to prevent outward movement of the key, the lip $w^4$ strikes the outer ejector $l^3$ and ejects the type. If the type have nicks, however, some of the tail ends of the tumblers will be thrown over, (by the springs,) so that they will come directly into line with the end of the key when the ring stops. Now, as, to correspond with the nicks in all and any of the types, there are in each ring-slot four tumblers, (which are relatively disposed by the springs $m^4$ in accordance with the number and position of the nicks in any type brought to them,) so there are to each key indicating-notches $x^4$, so relatively disposed in the end of each key that to each position into which the several tumblers are carried, in accordance with the nicks on the face of the types, there is a corresponding key, the notches of which being in position to allow the end of the key to pass beyond the adjacent ends of the tumblers, the key moves outward, pushing before it the ejector and ejecting the type.

Figs. 13 and 14 show the notches at the end of one of the keys. If, when the type-holding tumblers come opposite the first key, the tumblers have been displaced by reason of the nicks, their ends will be in the path of outward movement of the end of the key, (unless the notches correspond in position with the tumblers so moved,) and as the key cannot move out, the tumblers retain the type and the ring moves on, continuing to move intermittently, as described, with the type held by the tumblers, until they reach a key which has notches corresponding in position to the displaced or nick-entering tumblers, and when the ring reaches this position the key will move outward and the type will be ejected.

The type, when ejected into the channel $o^4$, is pressed between a spring, $a^5$, and the opposite wall of the channel, the spring holding it in erect position, or from falling over against the distributing-ring, and each channel is provided with a suitable sliding block, against which the line of types is supported while in the channel. From the channel the distributed types are delivered into any suitable receptacles.

To remove leads placed between any adjacent lines of types in the page fed over the galley to the lifter $l$, the face of the lifter is provided with two spring catches or hooks, $b^5$, as seen in Figs. 6 and 8. Each spring sets in a notch in the face of the lifter, and the stress of the springs is so slight that the contact of the line of types with the face of the lifter is sufficient to press the catches into the slots or beyond the face of the lifter. These catches therefore never disturb the movements of the types. As the leads are narrower than the length of a type the catches are placed at such position as to just come over the top of the lead, and if any line of types being fed to the distributer has next to it a lead the catches hook over the top of the lead, and as the lifter descends to take the next line of types the hooks take down with the lifter the lead and discharge it under the galley, while if no such lead is present the line of types presses the springs back into the face of the follower.

Thus it will be seen that the machine effects the distribution of leaded as well as solid matter.

From this description it will be obvious that all types (formed with nicks suited to the action of this machine) may be correctly and quickly distributed in accordance with the letter or character of each, that all the movements of the mechanism are positive, where positive action is necessary, and that the mechanism is compact and simple, accurate in its action, and not liable to derangement.

It will also be seen that the distributing capability of the machine is only limited by the number of selecting-tumblers and receiving-channels which may be employed.

It will also be seen that, the machine being entirely automatic in its action, no skill is required to effect the distribution.

The details of construction and arrangement of mechanism may, of course, be varied without departure from the essence of the invention; but the specific organization shown is considered best adapted to the work to be accomplished by the machine.

I have described the distributer as a ring having an intermittent rotative and progressive movement. The distributer may be made oblong, however, and have an endless chain of tumbler-slots, &c.; or it may be made straight, and have only a rectilinear movement, operating to distribute in moving in one direction, and sliding back to repeat such operative movement. The circular ring, however, is considered the best adapted to the work to be accomplished.

I claim—

1. In a type-distributing machine, a distributing-ring or type-receiver having a system of indicating-tumblers, carried by the type-receivers, the members of each set of which, coming in direct contact with the nicks in the edge of the type, indicate by such relative position the point at which the type is to be removed from the ring.

2. In a type-distributing machine, the arrangement of tumblers and sets of tumblers carried by the type-receivers, by which each type is directly seized in succession by one of the sets and held while being conveyed to its proper place of ejectment.

3. In combination with the type-seizing and indicating tumblers $t^3$, type slides or ejectors $l^3$ and keys $q^4$, by which each type is thrown from the machine.

4. The combination of the lever $k$, pawl $j$, and spring $i^2$, or their equivalents, for operating the page-follower, substantially as described.

5. In combination with such page-follower-actuating mechanism, mechanism for automatically throwing the pawl out of action with the follower-rack when the line of types is being fed into the channel.

6. The combination of the swing-bar $m$, crank-pin $p$, and incline $n$, operating to raise the lifter, substantially as described.

7. In combination with the devices named in the last preceding clause, the latch $r$, bent lever $k$, and its spring, for automatically effecting the release and fall of the lifter, substantially as described.

8. In combination with lifter $l$, for bringing each line of types into the follower-channel, the rack $t$ and follower $s$, for feeding the types toward the distributing-ring and tongue $a^3$, for taking them, type by type, up into the edge of the distributing-ring, substantially as described.

9. The rack $t$, by which the line-follower $s$ is automatically moved forward, (carrying before it the types,) and latch $r$, combined with the lifter $l$ and lever $t^2$, by which the follower is automatically moved back after the line of types is exhausted, substantially as described.

10. The combination of the reciprocating shaft $c^3$ and arm $b^3$, for imparting the vertical reciprocating movements to the tongue $a^3$, (which carries each type up into the ring,) substantially as described.

11. An intermittently-moving type-distributer, having a series of slots, each containing one set of the selecting-tumblers and ejector-slide, substantially as shown and described.

12. Giving to the ejector such an extent of inward movement, by means of key $q^4$, as to form a vertical groove in front of it, between the tumblers and the side of the slot in the ring for reception of the type, substantially as described.

13. The finger $k^3$, by which the type is held until the tumblers move against it, substantially as described.

14. For effecting the movements of the slide-keys, the key-actuator or cone $t^4$, substantially as described.

15. In combination with the keys and key-actuator, the springs $u^4$, substantially as described.

16. In combination with the lifter $l$, the spring-catches $b^5$, for removing the leads, substantially as described.

17. In combination with mechanism for raising each type into the distributer, the brush $p^3$, operating substantially as described.

18. A type-distributing ring, having an intermittent rotating movement, substantially as and for the purpose set forth.

19. The combination, with a revolving type-distributing ring, of a pin working in radial grooves in the ring, to impart to the ring an intermittent motion.

Signed November 4, 1869.

ORREN LEE BROWN.

Witnesses:
   FRANCIS GOULD,
   S. B. KIDDER.